United States Patent
Hong et al.

(10) Patent No.: US 10,936,057 B2
(45) Date of Patent: Mar. 2, 2021

(54) SYSTEM AND METHOD FOR NATURAL THREE-DIMENSIONAL CALIBRATION FOR ROBUST EYE TRACKING

(71) Applicant: Samsung Electronics Co., Ltd., Suwon-si (KR)

(72) Inventors: Injoon Hong, San Diego, CA (US); Sourabh Ravindran, Dallas, TX (US); Youngjun Yoo, Plano, TX (US); Michael O. Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/379,713

(22) Filed: Apr. 9, 2019

(65) Prior Publication Data

US 2020/0326774 A1    Oct. 15, 2020

(51) Int. Cl.
*G06F 3/01* (2006.01)
*G06T 11/60* (2006.01)

(52) U.S. Cl.
CPC .............. *G06F 3/013* (2013.01); *G06T 11/60* (2013.01)

(58) Field of Classification Search
CPC ....................................................... G06F 3/013
USPC ........................................................ 345/633
See application file for complete search history.

(56) References Cited

U.S. PATENT DOCUMENTS

| 9,791,927 B2 | 10/2017 | Lopez et al. |
| 9,936,195 B2 | 4/2018 | Horesh |
| 2015/0302585 A1 | 10/2015 | VanBlon et al. |
| 2016/0134863 A1* | 5/2016 | Horesh ................ H04N 17/002 348/78 |
| 2017/0115742 A1 | 4/2017 | Xing et al. |

(Continued)

FOREIGN PATENT DOCUMENTS

| EP | 3129849 A1 | 2/2017 |
| JP | 2013114691 A | 6/2013 |

(Continued)

OTHER PUBLICATIONS

International Search Report and Written Opinion of the International Searching Authority in connection with International Patent Application No. PCT/KR2019/014130 dated Feb. 5, 2020, 8 pages.

*Primary Examiner* — Shivang I Patel

(57) ABSTRACT

A method for eye tracking in a head-mountable device (HMD) includes determining at least one object within a three-dimensional (3D) extended reality (XR) environment as an eye tracking calibration point and determining a 3D location of the eye tracking calibration point within the XR environment. The method also includes detecting a gaze point of a user of the HMD and comparing the detected gaze point to an area of the XR environment that includes the 3D location of the eye tracking calibration point. The method further includes, in response to determining that the user is looking at the eye tracking calibration point based on the detected gaze point being within the area, calibrating, using a processor, the HMD to correct a difference between the eye tracking calibration point and the detected gaze point. In addition, the method includes, in response to determining that the user is not looking at the eye tracking calibration point based on the detected gaze point being outside of the area, maintaining an existing calibration of the HMD.

20 Claims, 7 Drawing Sheets

(56) References Cited

U.S. PATENT DOCUMENTS

| | | | |
|---|---|---|---|
| 2017/0336867 A1 | 11/2017 | Wilairat et al. | |
| 2018/0032131 A1 | 2/2018 | Yasuda et al. | |
| 2018/0300897 A1* | 10/2018 | Woods | G06F 3/012 |
| 2018/0336719 A1 | 11/2018 | Chen | |
| 2019/0018485 A1* | 1/2019 | Aleem | G06K 9/00 |
| 2019/0265788 A1 | 8/2019 | Yosha et al. | |

FOREIGN PATENT DOCUMENTS

| | | |
|---|---|---|
| KR | 101433921 B1 | 8/2014 |
| KR | 101817436 B1 | 2/2018 |
| KR | 10-2018-0109275 A | 10/2018 |
| KR | 10-2018-0122012 A | 11/2018 |
| WO | 2015192117 A1 | 12/2015 |

\* cited by examiner

SYSTEM AND METHOD FOR NATURAL THREE-DIMENSIONAL CALIBRATION FOR ROBUST EYE TRACKING

TECHNICAL FIELD

This disclosure relates generally to eye tracking systems. More specifically, this disclosure relates to a system and method for natural three-dimensional calibration for robust eye tracking.

BACKGROUND

Virtual reality (VR), augmented reality (AR), and mixed reality (MR) applications are becoming more numerous and more popular. VR, AR, and MR technologies may be referred to collectively as extended reality (XR) technologies. Typically, XR-related experiences are provided to users through head-mountable devices (HMDs). Head-mountable devices often use eye tracking (ET) to support XR experiences in a number of ways. For example, eye tracking can be used to estimate where a user is looking within an XR environment, and this information can be used by an XR application to provide information to the user or to modify the XR experience. In order to provide accurate eye tracking, calibration for each user of a head-mountable device or other device is typically needed.

SUMMARY

This disclosure provides a system and method for natural three-dimensional calibration for robust eye tracking.

In a first embodiment, a method for eye tracking in a head-mountable device (HMD) includes determining at least one object within a three-dimensional (3D) extended reality (XR) environment as an eye tracking calibration point and determining a 3D location of the eye tracking calibration point within the XR environment. The method also includes detecting a gaze point of a user of the HMD and comparing the detected gaze point to an area of the XR environment that includes the 3D location of the eye tracking calibration point. The method further includes, in response to determining that the user is looking at the eye tracking calibration point based on the detected gaze point being within the area, calibrating, using a processor, the HMD to correct a difference between the eye tracking calibration point and the detected gaze point. In addition, the method includes, in response to determining that the user is not looking at the eye tracking calibration point based on the detected gaze point being outside of the area, maintaining an existing calibration of the HMD.

In a second embodiment, an HMD includes at least one display configured to present a 3D XR environment and at least one processor. The at least one processor is configured to determine at least one object within the XR environment as an eye tracking calibration point and determine a 3D location of the eye tracking calibration point within the XR environment. The at least one processor is also configured to detect a gaze point of a user of the HMD and compare the detected gaze point to an area of the XR environment that includes the 3D location of the eye tracking calibration point. The at least one processor is further configured, in response to determining that the user is looking at the eye tracking calibration point based on the detected gaze point being within the area, to calibrate the HMD to correct a difference between the eye tracking calibration point and the detected gaze point. In addition, the at least one processor is configured, in response to determining that the user is not looking at the eye tracking calibration point based on the detected gaze point being outside of the area, to maintain an existing calibration of the HMD.

In a third embodiment, a non-transitory computer-readable medium embodies a computer program. The computer program includes computer readable program code that, when executed, causes at least one processor to determine at least one object within a 3D XR environment as an eye tracking calibration point and determine a 3D location of the eye tracking calibration point within the XR environment. The computer program also includes computer readable program code that, when executed, causes the at least one processor to detect a gaze point of a user of the HMD and compare the detected gaze point to an area of the XR environment that includes the 3D location of the eye tracking calibration point. The computer program further includes computer readable program code that, when executed, causes the at least one processor, in response to determining that the user is looking at the eye tracking calibration point based on the detected gaze point being within the area, to calibrate the HMD to correct a difference between the eye tracking calibration point and the detected gaze point. In addition, the computer program includes computer readable program code that, when executed, causes the at least one processor, in response to determining that the user is not looking at the eye tracking calibration point based on the detected gaze point being outside of the area, to maintain an existing calibration of the HMD.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module,"

"device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
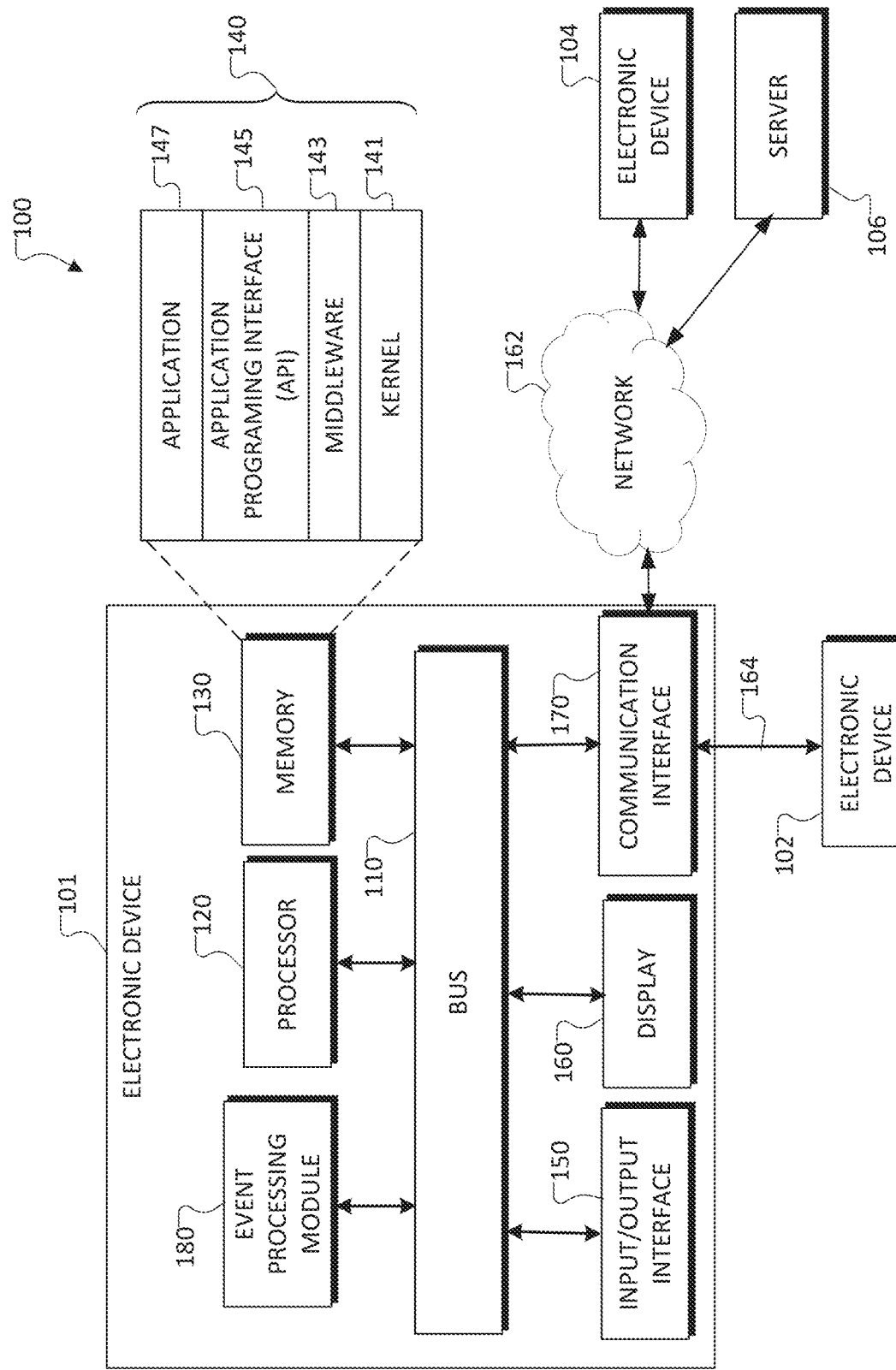
FIG. 1 illustrates an example network configuration in accordance with various embodiments of this disclosure.

FIGS. 1 through 7, discussed below, and the various embodiments of this disclosure are described with reference to the accompanying drawings. However, it should be appreciated that this disclosure is not limited to the embodiments and all changes and/or equivalents or replacements thereto also belong to the scope of this disclosure. The same or similar reference denotations may be used to refer to the same or similar elements throughout the specification and the drawings.

Virtual reality (VR), augmented reality (AR), and mixed reality (MR) are typically implemented using head-mountable devices (HMDs) that include displays on which VR, AR, or MR environments are generated for users to experience. VR, AR, and MR technologies may be referred to collectively as extended reality (XR) technologies. Eye tracking is a valuable feature for XR applications. Eye tracking allows gaze estimation, meaning estimation of a point in three-dimensional (3D) space at which a user's eyes are focused. Sensors used for eye tracking are typically located on the inside of a head-mountable device and are directed towards the user's eyes to perform gaze estimation. Accordingly, differences between face shapes of different users, distance from the user's face to the eye tracking sensors, inaccurate 3D eyeball modeling, incorrect values for optical axis offset, corneal refraction, movement of the HMD during calibration, or other problems can cause errors in gaze estimation. Eye tracking calibration typically attempts to correct errors in eye tracking by adjusting an estimated gaze point to match an actual point in 3D space at which a user is focused.

Typical eye tracking calibration is an active process in which software on the head-mountable device instructs the user to look at various reference calibration points generated by the software at different points in a 3D display before performing gaze estimation. Accordingly, the software knows the user's true gaze point because the software has generated that point, and calibration can be performed to adjust a user's estimated gaze point to match the reference point. This calibration may be performed, for example, at system startup, when the head-mountable device detects that it has been placed onto a user's head (such as when users swap the device without restarting the system), when a user manually initiates calibration, or the like. However, this does not account for all cases in which calibration may become inaccurate, meaning recalibration may be needed or desired during use to maintain accurate eye tracking.

This disclosure provides various natural background calibration processes that maintain accurate eye tracking by recalibrating eye tracking during natural use of a head-mountable device or other device, without interrupting a user to perform any special calibration tasks. For example, in some embodiments of this disclosure, eye tracking calibration is performed using already-existing elements in a 3D XR environment as reference points for calibration. This can be done based on the assumption that the user will naturally be looking at these elements when gaze estimation is performed. For instance, a user can interface with the XR environment by virtually touching an interface element or a keyboard or, in some embodiments, by touching an interface element on a physical touch screen of a device that is being viewed within an XR environment. Here, it may be assumed that the user will be looking at the interface element to be touched, so the interface element can be used as a reference point for eye tracking calibration. As another example, simultaneous localization and mapping (SLAM) can be used to generate a 3D map of an XR environment, and a salient object within the 3D map can be determined as an object of interest that the user is likely to look at. The system can then assume that the user is looking at the salient object while performing gaze estimation.

The natural background calibration techniques disclosed here can be used to update eye tracking calibration continuously, periodically, or at any other suitable times, reducing or removing the need for a dedicated calibration exercise. This could, for example, allow a head-mountable device to maintain accurate eye tracking while the head-mountable device shifts on a user's face during normal movement. In some embodiments, an initial dedicated calibration exercise could still be performed when a new user puts on the head-mountable device, and eye tracking calibration could then be maintained and updated using the techniques described in this disclosure.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (IO) interface 150, a display 160, a communication interface 170, or an event processing module 180. In some embodiments, the electronic device 101 may exclude at least one of the components or may add another component. In some embodiments, the electronic device 101 is an HMD that supports XR applications.

The bus 110 includes a circuit for connecting the components 120 to 180 with one another and transferring communications (such as control messages and/or data) between the components. The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can perform gaze estimation, generate objects for display in a 3D XR environment, perform SLAM to generate 3D reconstruction maps of an XR environment, calibrate gaze estimation, or perform other actions as described in this disclosure.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or a memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 can include a host calibration application that performs dedicated calibration of gaze estimation and a natural calibration application that performs natural background calibration of gaze estimation. A dedicated calibration application can generate calibration points for display at known locations in a 3D XR environment and instruct a user to look at these calibration points while performing gaze estimation. The dedicated calibration application can then adjust the gaze estimation to correct for differences between estimated gaze points and the known 3D locations of the calibration points. A natural calibration application can determine objects within a 3D XR environment as points of interest and determine when a user is likely to be looking at these points of interest. The natural calibration application can then perform gaze estimation while the user is likely to be looking at these points of interest and adjust the gaze estimation to correct for differences between estimated gaze points and the 3D locations of the points of interest. These functions can be performed by a single application or by multiple applications that each carries out one or more of these functions.

The middleware 143 can function as a relay to allow the API 145 or the application 147 to communicate data with the kernel 141, for example. A plurality of applications 147 can be provided. The middleware 143 is able to control work requests received from the applications 147, for example, by allocating the priority of using the system resources of the electronic device 101 (such as the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing or text control.

The IO interface 150 serves as an interface that can, for example, transfer commands or data input from a user or other external devices to other component(s) of the electronic device 101. Further, the IO interface 150 can output commands or data received from other component(s) of the electronic device 101 to the user or the other external device.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may further represent or include one or more lenses or other display surfaces associated with smart glasses or other wearable devices. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals.

The electronic device 101 further includes one or more sensors that can meter a physical quantity or detect an activation state of the electronic device 101 and convert metered or detected information into an electrical signal. For example, a sensor can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101.

The wireless communication is able to use at least one of, for example, long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 180 implemented in the electronic device 101. For example, the event processing module 180 can process at least a part of information obtained from other elements (such as the processor 120, the memory 130, the input/output interface 150, or the communication interface 170) and can provide the same to the user in various manners.

While in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 or another processor. The event processing module 180 can perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
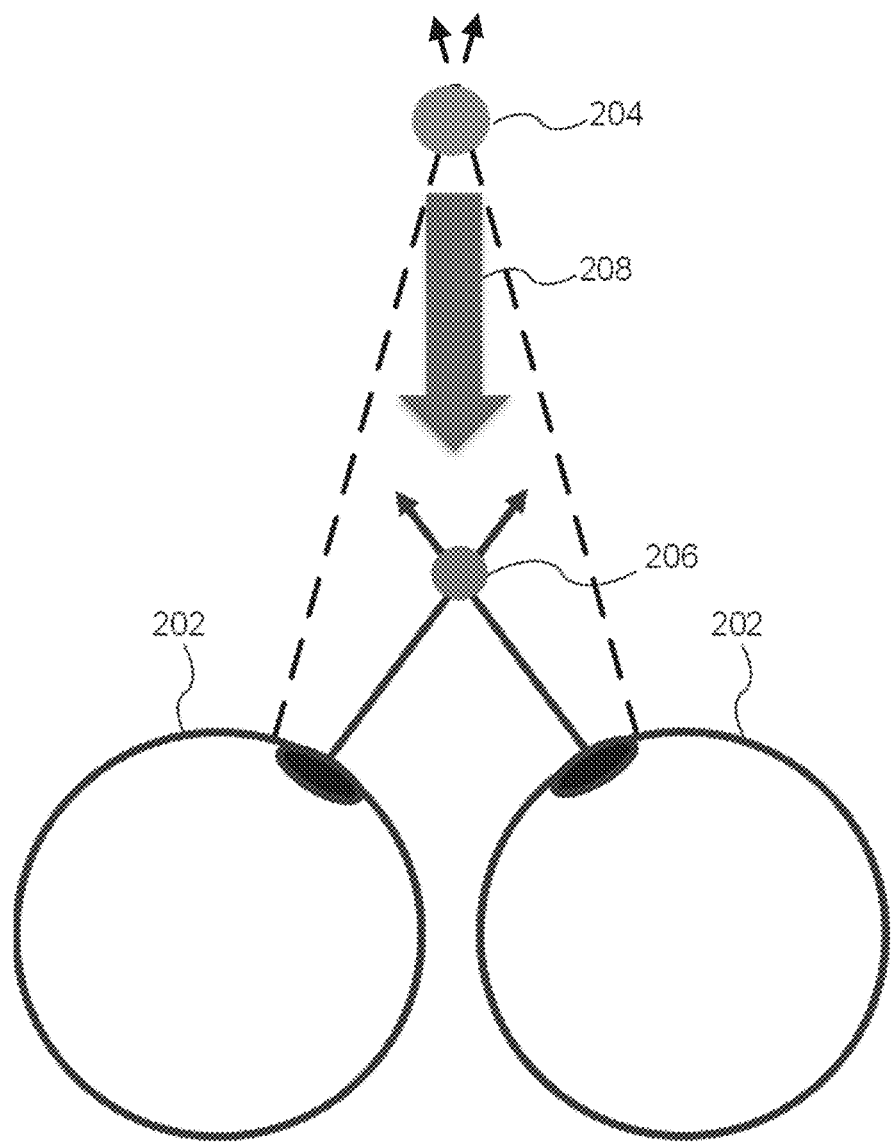
FIG. 2 illustrates an example eye tracking calibration in accordance with various embodiments of this disclosure.

FIG. 2 illustrates an example eye tracking calibration in accordance with various embodiments of this disclosure. The eye tracking calibration shown in FIG. 2 can be implemented using eye tracking supported by the electronic device 101 shown in FIG. 1, which could represent an XR HMD. However, the eye tracking calibration shown in FIG. 2 could be used by any other suitable device in any other suitable system.

As shown in FIG. 2, when a user is looking at an object, the user's eyes 202 focus on a point in 3D space where the object is located, which is the true gaze point 206. Gaze estimation attempts to determine, based on analyzing features of one or both of the user's eyes 202, where the user's eyes 202 are focusing in 3D space. In this example, performing gaze estimation results in a determination of an estimated gaze point 204, which represents an estimated point in 3D space on which the user is focusing. In some cases, the gaze estimation system can have errors that result in an inaccurate estimation of the estimated gaze point 204. In such cases, there is an error or difference 208 between the true gaze point 206 on which the user is focusing and the estimated gaze point 204. Calibration of the eye tracking system can be performed to adjust the gaze estimation algorithm to correct for such errors.

Although FIG. 2 illustrates one example of eye tracking calibration, various changes may be made to FIG. 2. For example, the estimated gaze point 204 can differ from the true gaze point 206 in any number of ways when error exists in the gaze estimation.

Figure 3:
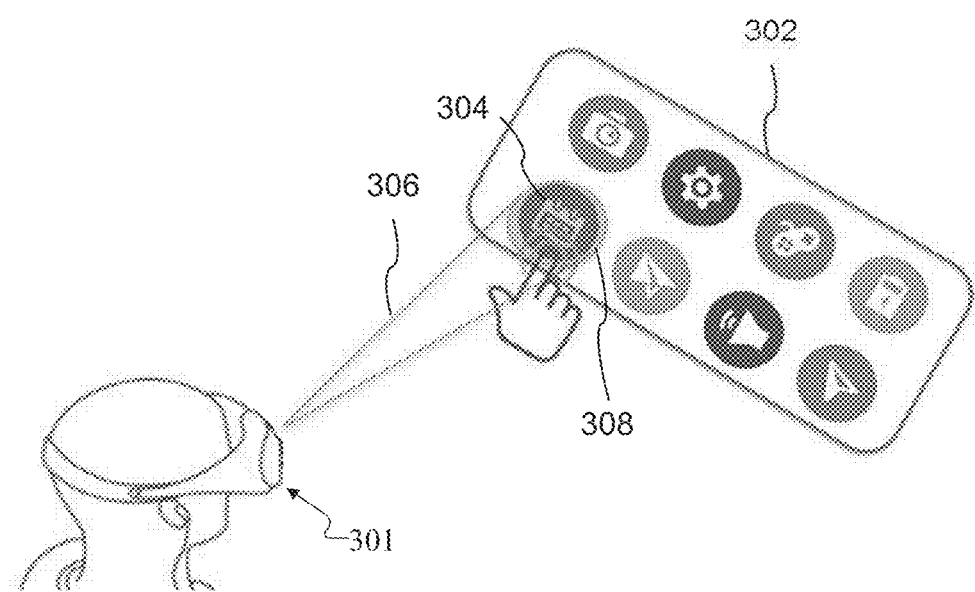
FIG. 3 illustrates an example natural eye tracking calibration based on generated calibration points in accordance with various embodiments of this disclosure.

FIG. 3 illustrates an example natural eye tracking calibration based on generated calibration points in accordance with various embodiments of this disclosure. The eye tracking calibration shown in FIG. 3 can be implemented using eye tracking supported by the electronic device 101 shown in FIG. 1, which could represent an XR HMD. However, the eye tracking calibration shown in FIG. 3 could be used by any other suitable device in any other suitable system.

As shown in FIG. 3, a user is using an HMD 301, which could represent one example implementation of the electronic device 101 shown in FIG. 1. The user of the HMD 301 is viewing a set of virtual icons 302 in a 3D XR environment. The set of icons 302 represents virtual interface elements in this embodiment, although the set of icons 302 could represent any sort of virtual object(s) with which a user can interact in a 3D XR environment, including any sort of interface object(s). The HMD 301 knows or is able to determine the 3D location of each icon in the set 302 within the XR environment. In some embodiments, the set of icons 302 is generated by the HMD 301 for display within the XR environment.

In this example, the user interacts with a specific virtual icon 304. For example, the icon 304 could represent a button that the user virtually touches. Due to general principles of hand-eye coordination, it is known that the user is highly likely to be looking at the icon 304 while interacting with the icon 304. Accordingly, if the HMD 301 performs gaze estimation as the user interacts with the icon 304, it is highly likely that the user's gaze 306 should focus on the icon 304, and an estimated gaze point 308 should coincide with the known 3D location of the icon 304. In this way, the icon 304 can be considered a calibration point for the purposes of eye tracking calibration.

Once gaze estimation has been performed to find the estimated gaze point 308, the HMD 301 can compare the estimated gaze point 308 with the known 3D location of the icon 304. If there is a difference determined between the location of the estimated gaze point 308 and the location of the icon 304, the HMD 301 can calibrate the eye tracking algorithm to correct for this difference. Here, the user is unaware that a calibration has been performed since the calibration is based on the user's natural actions within the XR environment. This calibration could be performed each time a user interacts with an object such as an icon, at a periodic rate (such as once per minute, once per hour, etc.), or in response to certain stimuli (such as when sensors within the HMD 301 detect that the HMD 301 has moved relative to the user's face).

In some embodiments, calibration is performed using objects positioned at multiple 3D depths relative to the HMD 301. For example, the calibration process could wait until multiple icons 304 are identified at different depths (such as in different interfaces within the XR environment) and perform calibration based on the result of gaze estimation performed for each identified icon 304. This could provide greater accuracy and protect from any errors in calibration based on a single calibration point.

Figures 4A, 4B:
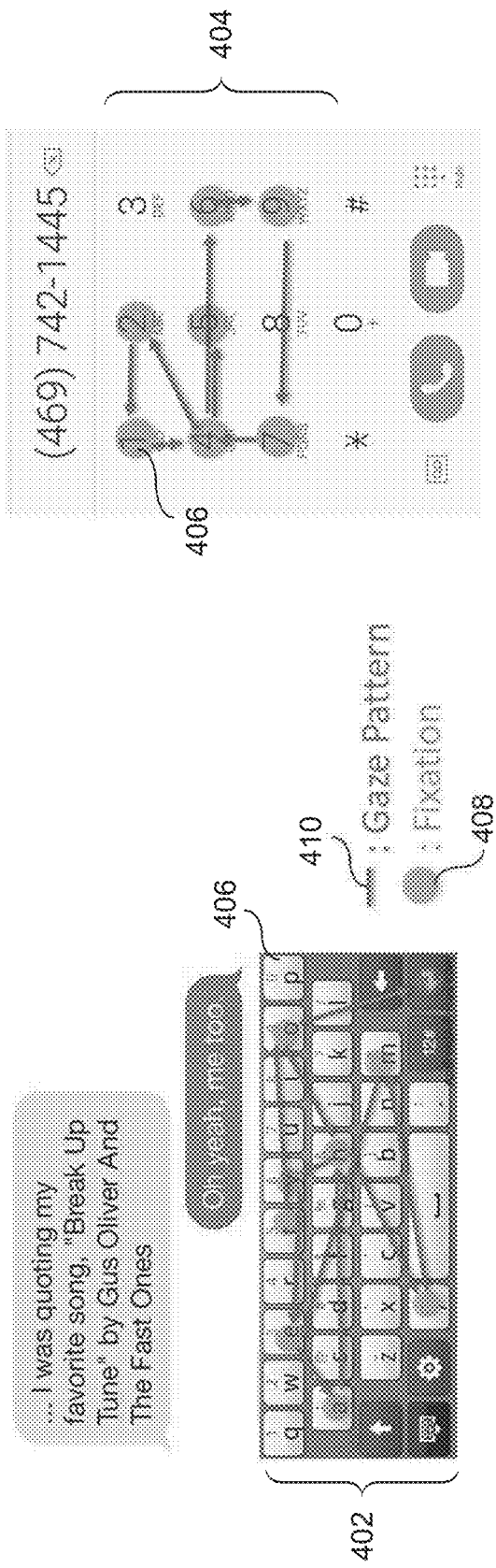
FIGS. 4A and 4B illustrate example natural eye tracking calibrations based on other calibration points in accordance with various embodiments of this disclosure.

FIGS. 4A and 4B illustrate example natural eye tracking calibrations based on other calibration points in accordance with various embodiments of this disclosure. The eye tracking calibrations shown in FIGS. 4A and 4B can be implemented using eye tracking supported by the electronic device 101 shown in FIG. 1, which could represent an XR HMD. However, the eye tracking calibrations shown in FIGS. 4A and 4B could be used by any other suitable device in any other suitable system.

The embodiments of the eye tracking calibrations shown in FIGS. 4A and 4B are similar to the embodiment of the eye tracking calibration shown in FIG. 3. In the embodiment shown in FIG. 4A, the user is typing on a virtual keyboard 402. In the embodiment shown in FIG. 4B, the user is dialing a phone number on a virtual keypad 404. In these examples, the virtual keyboard 402 and the virtual keypad 404 include a number of individual virtual keys 406 that can be potential calibration points. As a user types on the keyboard 402 or keypad 404, it is highly likely that the user will be sequentially looking at a number of interface elements (virtual keys 406) as the user actuates them. Accordingly, it is highly likely that the user will have a number of fixed gaze points 408, each of which corresponds to one of the virtual keys 406, at the time that the user actuates that key 406. In addition, it is highly likely that the user's gaze will track between each actuated virtual key 406 sequentially along a gaze pattern 410. This knowledge of the user's likely gaze locations 408 and likely gaze patterns 410 can be used, as described above with respect to FIG. 3, to perform natural eye tracking calibration.

Figure 5:
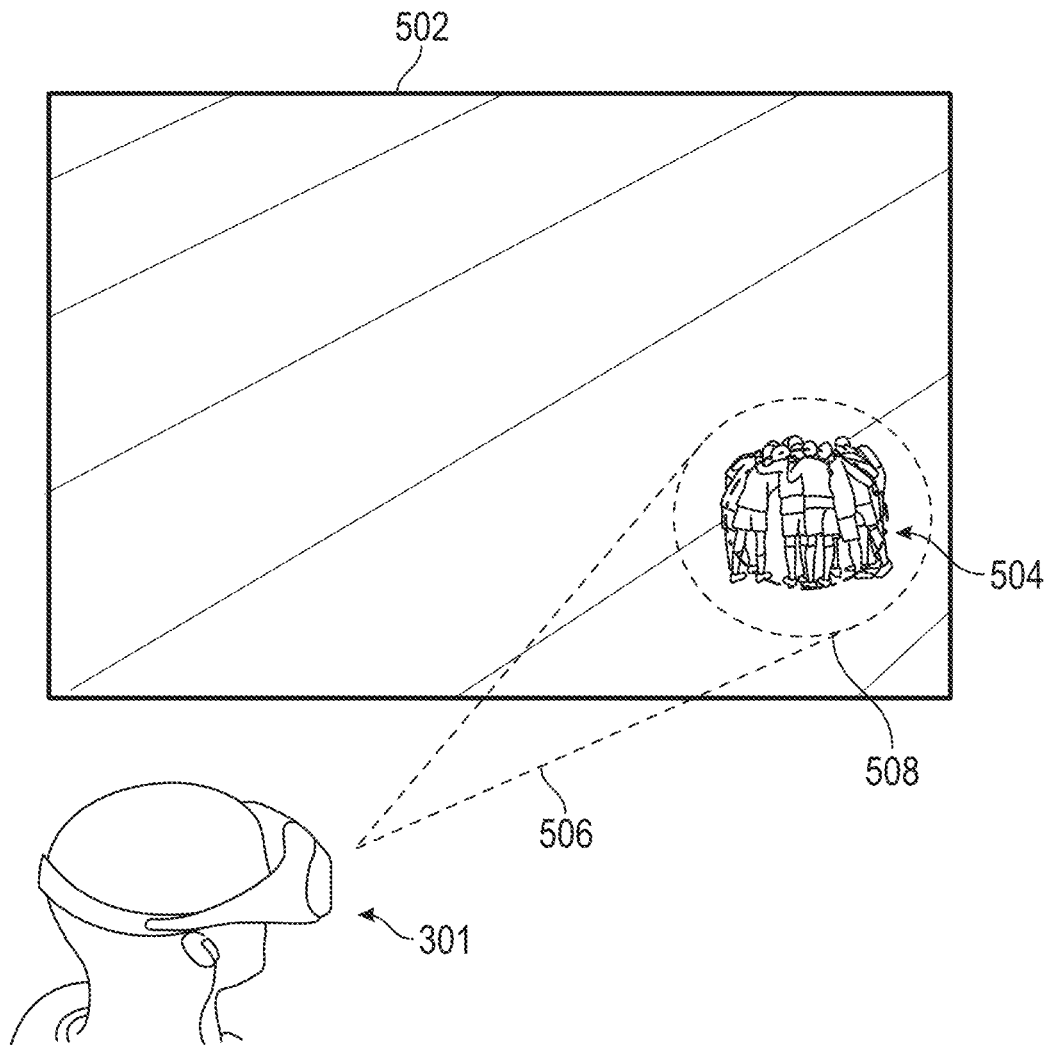
FIG. 5 illustrates an example natural eye tracking calibration based on detected salient points in accordance with various embodiments of this disclosure.

FIG. 5 illustrates an example natural eye tracking calibration based on detected salient points in accordance with various embodiments of this disclosure. The eye tracking calibration shown in FIG. 5 can be implemented using eye tracking supported by the electronic device 101 shown in FIG. 1, which could represent an XR HMD. However, the eye tracking calibration shown in FIG. 5 could be used by any other suitable device in any other suitable system.

As shown in FIG. 5, the user is viewing a 3D scene 502 though the HMD 301. In some embodiments, the 3D scene 502 is an XR environment, which can be partially or completely virtual. As particular examples, the 3D scene 502 could be a real-world scene viewed in AR or MR or a virtual scene viewed in VR, AR, or MR. The HMD 301 can generate a 3D reconstruction map of the XR environment around it, including the 3D scene 502. In some embodiments, the 3D reconstruction map is generated using SLAM. The HMD 301 can then detect salient objects within the environment, such as salient object 504, that the user is likely to look at when the user is viewing the 3D scene 502. Once a salient object 504 has been detected, the HMD 301 can assume that it is likely that the user's gaze 506 should focus on the salient object 504 and that an estimated gaze point 508 should coincide with a known 3D location of the salient object 504 (as determined from the 3D reconstruction map). In this way, the salient object 504 can be considered a calibration point for purposes of eye tracking calibration.

Once gaze estimation has been performed to find the estimated gaze point 508, the HMD 301 can compare the estimated gaze point 508 with the known 3D location of the salient object 504. If there is a difference determined between the location of the estimated gaze point 508 and the location of the salient object 504, the HMD 301 can calibrate the eye tracking algorithm to correct for this difference. In this embodiment, as in the embodiments above, the user may be unaware that calibration has been performed since the calibration is based on the user's natural viewing patterns within the XR environment. This calibration could be performed each time a user interacts with an object such as an icon, at a periodic rate (such as once per minute, once per hour, etc.), or in response to certain stimuli (such as when sensors within the HMD 301 detect that the HMD 301 has moved relative to the user's face).

In some embodiments, calibration is performed using salient objects 504 positioned at multiple 3D depths relative to the HMD 301. For example, the calibration process could wait until multiple salient objects 504 are identified at different depths and perform calibration based on the result of gaze estimation performed for each identified salient object 504. This could provide greater accuracy and protect from any errors in calibration based on a single calibration point.

Although FIGS. 3, 4A, 4B, and 5 illustrate examples of natural eye tracking calibrations, various changes may be made to FIGS. 3, 4A, 4B, and 5. For example, while these figures have illustrated specific types of objects that can be used to support natural eye tracking calibration, any other suitable object(s) in an XR environment could be used.

Figure 6:
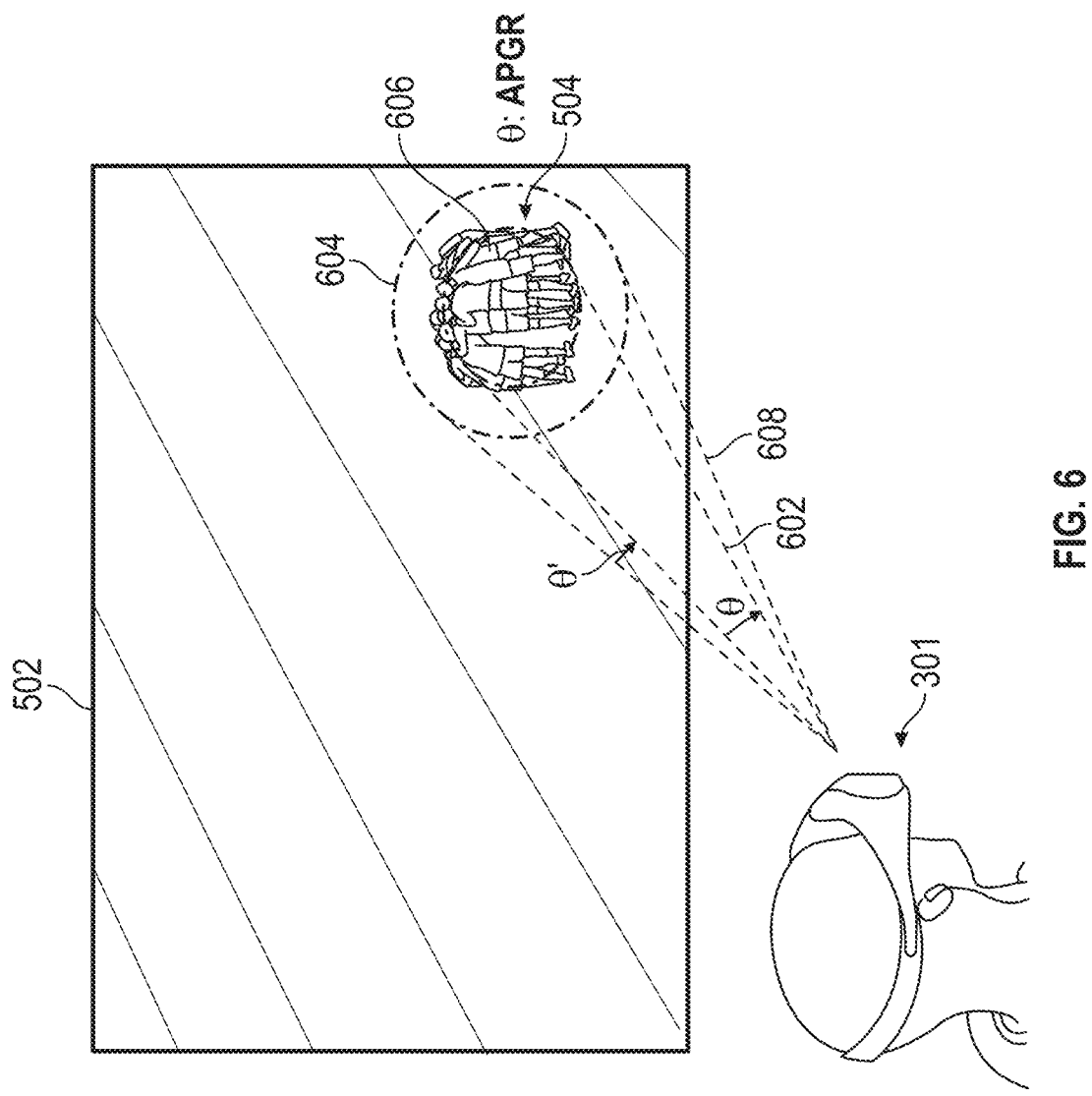
FIG. 6 illustrates an example determination of whether a user is looking at a calibration point in accordance with various embodiments of this disclosure.

FIG. 6 illustrates an example determination of whether a user is looking at a calibration point in accordance with various embodiments of this disclosure. The determination shown in FIG. 6 can be implemented using eye tracking supported by the electronic device 101 shown in FIG. 1, which could represent an XR HMD. However, the determination shown in FIG. 6 could be made by any other suitable device in any other suitable system.

In the embodiments shown in FIGS. 3, 4A, 4B, and 5, scenarios are illustrated in which the HMD 301 performs natural eye tracking calibration in the background while a user operates in an XR environment, based on a determination that a user is likely to be looking at a specific known location. However, it is possible that the HMD 301 can be mistaken in this determination, which could result in calibration being performed while a user is not actually looking at a known calibration point. This could then introduce errors instead of correcting errors with the calibration process.

In order to avoid this situation, the HMD 301 can perform an additional process to verify whether the user is looking at the determined calibration point. This process is shown in FIG. 6. Note that the process shown in FIG. 6 is illustrated with the 3D scene 502 of FIG. 5, but the process shown in FIG. 6 can work with any other embodiment (including the embodiments shown in FIGS. 3, 4A, and 4B). As shown in FIG. 6, when a user is viewing an XR environment through the HMD 301 and the salient object 504 has been determined as a calibration point, gaze estimation is performed. If the gaze estimation identifies an estimated gaze 602 within the viewing angle θ centered on the salient object 504, the HMD 301 determines that the estimated gaze is within an area of potential gaze region (APGR) 604. Thus, the estimated gaze 602 is already directed at the salient object 504, reflecting the user's true gaze point 606, and accordingly calibration may not be necessary.

If the gaze estimation identifies an estimated gaze 608 that extends an additional amount θ' outside of the viewing angle of the estimated gaze 602, the HMD 301 may determine that the user is looking at the salient object 504 (and therefore is within the APGR 604). However, in this case, there is a calibration error that is causing the gaze estimation not to align with the user's true gaze point 606. The HMD 301 may therefore apply natural calibration to correct the error. The value of θ' can differ from the value of θ by any suitable amount, such as 5°, 10°, 20°, or other value.

If the gaze estimation identifies an estimated gaze outside the APGR 604, the HMD 301 can determine that the user is in fact not looking at the salient object 504. Accordingly, the HMD 301 does not perform natural eye tracking calibration because doing so would introduce errors rather than correct errors. Using this process, natural background eye tracking calibration can be performed while protecting against calibration under erroneous assumptions that the user is looking at a determined calibration point.

Although FIG. 6 illustrates one example of a determination of whether a user is looking at a calibration point, various changes may be made to FIG. 6. For example, the size of the calibration point can vary, so the values of the angles θ and θ' can differ depending on the calibration point.

Figure 7:
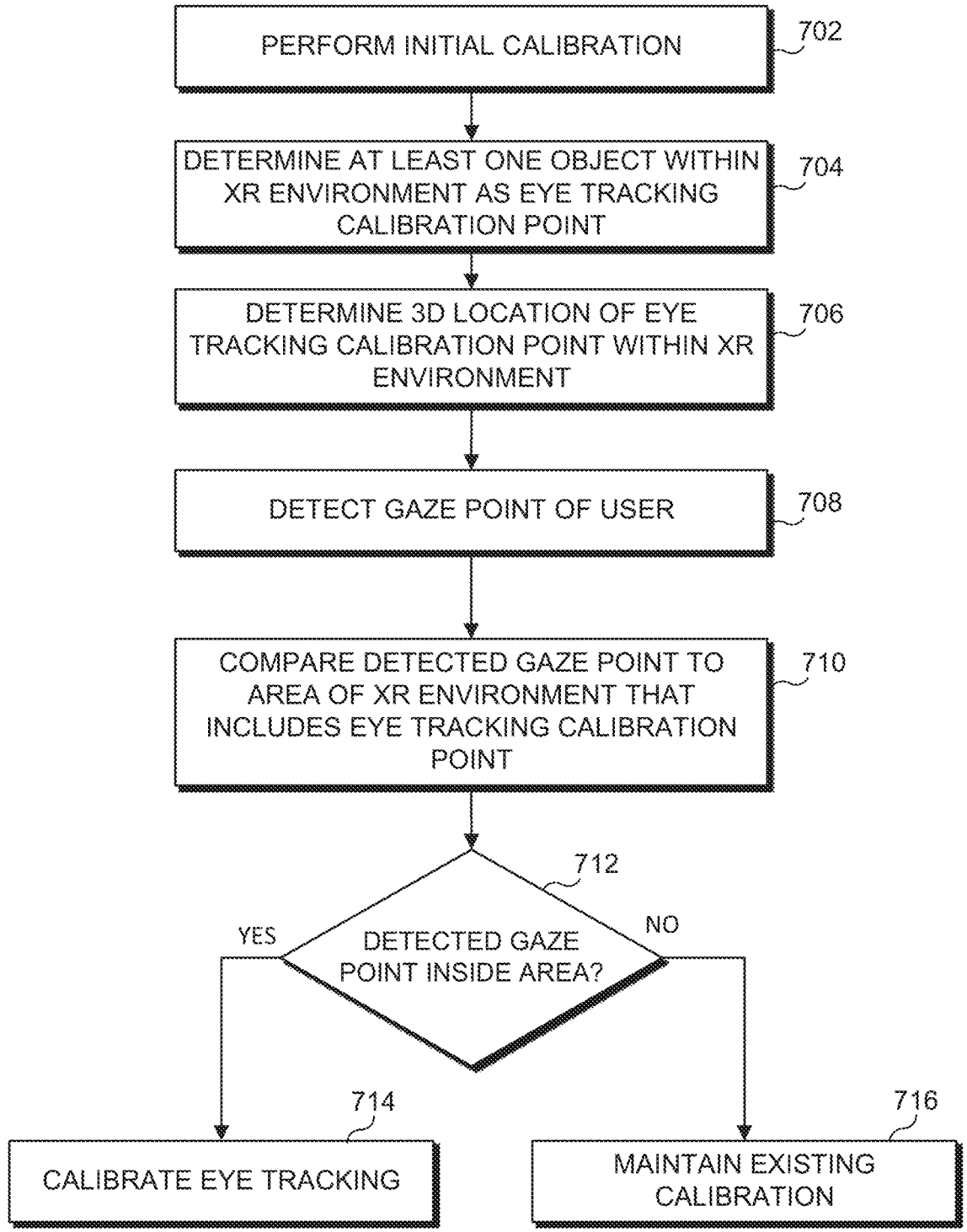
FIG. 7 illustrates an example method for natural eye tracking calibration in accordance with various embodiments of this disclosure.

FIG. 7 illustrates an example method 700 for natural eye tracking calibration in accordance with various embodiments of this disclosure. The method 700 shown in FIG. 7 can be performed using eye tracking supported by the electronic device 101 shown in FIG. 1, which could represent an XR HMD. However, the method 700 shown in FIG. 7 can be performed by any other suitable device in any other suitable system.

An electronic device 101 performs an initial calibration at step 702. In some embodiments, the initial calibration includes generating at least one target location in a 3D XR environment and instructing the user to look at the at least one target location. The initial calibration may also include detecting one or more gaze points of the user after instructing the user to look at the at least one target location and calibrating the electronic device 101 based on the one or more detected gaze points of the user compared to the at least one target location. The XR environment here can be one of a virtual reality environment, an augmented reality environment, and a mixed reality environment. Note that any suitable initial eye tracking calibration can be performed here, including any calibrations now known or later developed.

The electronic device 101 determines at least one object within the XR environment as an eye tracking calibration point at step 704. This can include determining that the user is likely to look at one or more objects within the XR environment. In some embodiments, the at least one object is rendered by the electronic device 101 itself and is an interface element with which the user interacts. In other embodiments, the at least one object is an object in the XR environment and may be an object that the user does not directly interact with. In still other embodiments, the at least one object includes a plurality of objects arranged at different depths within the XR environment.

The electronic device 101 determines a 3D location of each eye tracking calibration point within the XR environment at step 706. When the eye tracking calibration point is an interface element that is rendered by the electronic device 101, the 3D location of the eye tracking calibration point can be determined at the time of rendering and represents the location at which the object is rendered. If the eye tracking calibration point is an object in the XR environment, determining the 3D location of the eye tracking calibration point can include creating a 3D reconstruction map of the XR environment and determining the location of the eye tracking calibration point in the 3D reconstruction map.

The electronic device 101 detects a gaze point of a user of the electronic device 101 at step 708. This could include the electronic device 101 performing gaze estimation using one or more sensors of the electronic device 101. The electronic device 101 compares the detected gaze point to an area of the XR environment that includes the 3D location of the eye tracking calibration point at step 710. In some embodiments, this includes comparing the detected gaze point to an area of potential gaze region (APGR) that includes the eye tracking calibration point.

At step 712, the electronic device 101 determines whether the detected gaze point is inside of the area of the XR environment that includes the 3D location of the eye tracking calibration point. If the detected gaze point is inside of the area, the electronic device 101 determines that the user is looking at the eye tracking calibration point based on the detected gaze point being within the area. In response, the electronic device 101 calibrates itself to correct for a difference between the eye tracking calibration point and the detected gaze point at step 714. If the detected gaze point is outside of the area, the electronic device 101 determines that the user is not looking at the eye tracking calibration point based on the detected gaze point being outside of the area. In response, the electronic device 101 maintains an existing calibration at step 716.

Although FIG. 7 illustrates one example of a method 700 for natural eye tracking calibration, various changes may be made to FIG. 7. For example, while shown as a series of steps, various steps in FIG. 7 could overlap, occur in parallel, occur in a different order, or occur any number of times.

The embodiments described above are not meant to be limiting and are merely illustrative of various aspects of this disclosure. While example embodiments may be indicated as applicable to a particular device category (such as head-mounted displays), the processes and examples provided above are not intended to be solely limited to those device categories and can be broadly applicable to various device categories (such as appliances, mobile devices, computers, automobiles, etc.).

While the figures have been described and novel features as applied to various embodiments have been pointed out above, it will be understood that various omissions, substitutions, and changes in the form and details of the systems, devices, or processes described above may be made by those skilled in the art without departing from the scope of this disclosure. This description is in no way meant to be limiting but rather should be taken as illustrative of the general principles of this disclosure.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method for eye tracking in a head-mountable device (HMD), the method comprising:
   determining at least one object within a three-dimensional (3D) extended reality (XR) environment as an eye tracking calibration point;
   creating a 3D reconstruction map of the XR environment;
   determining a 3D location of the eye tracking calibration point within the XR environment based on a location of the eye tracking calibration point in the 3D reconstruction map;
   detecting a gaze point of a user of the HMD;
   comparing the detected gaze point to a first area of the XR environment that includes the 3D location of the eye tracking calibration point and to a second area of the XR environment that includes the 3D location of the eye tracking calibration point, the second area larger than the first area and concentric with the first area;
   in response to determining that the user is looking at the eye tracking calibration point and calibration is unnecessary based on the detected gaze point being within the first area, maintaining an existing calibration of the HMD;
   in response to determining that the user is looking at the eye tracking calibration point and calibration is necessary based on the detected gaze point being outside of the first area but within the second area, calibrating, using a processor, the HMD to correct a difference between the eye tracking calibration point and the detected gaze point; and
   in response to determining that the user is not looking at the eye tracking calibration point based on the detected gaze point being outside of the second area, maintaining the existing calibration of the HMD.

2. The method of claim 1, wherein:
   the at least one object is rendered by the HMD and is an interface element with which the user interacts; and
   the gaze point of the user is detected at a time when the user interacts with the at least one object.

3. The method of claim 1, wherein:
   the at least one object is an object in the XR environment; and
   determining the at least one object as the eye tracking calibration point comprises determining that the user is likely to look at the at least one object during natural use of the HMD.

4. The method of claim 3, wherein determining the 3D location of the eye tracking calibration point comprises creating the 3D reconstruction map of the XR environment using simultaneous localization and mapping (SLAM).

5. The method of claim 1, wherein the at least one object includes a plurality of objects arranged at different depths within the XR environment.

6. The method of claim 1, further comprising:
   before determining the at least one object as the eye tracking calibration point, performing an initial calibration that comprises:
      generating at least one target location in the XR environment;
      instructing the user to look at the at least one target location;
      detecting one or more gaze points of the user after instructing the user to look at the at least one target location; and
      calibrating the HMD based on the one or more detected gaze points of the user compared to the at least one target location.

7. The method of claim 1, wherein the XR environment comprises one of: a virtual reality environment, an augmented reality environment, and a mixed reality environment.

8. A head-mountable device (HMD) comprising:
   at least one display configured to present a three-dimensional (3D) extended reality (XR) environment; and
   at least one processor configured to:
      determine at least one object within the XR environment as an eye tracking calibration point;
      create a 3D reconstruction map of the XR environment;
      determine a 3D location of the eye tracking calibration point within the XR environment based on a location of the eye tracking calibration point in the 3D reconstruction map;
      detect a gaze point of a user of the HMD;
      compare the detected gaze point to a first area of the XR environment that includes the 3D location of the eye tracking calibration point and to a second area of the XR environment that includes the 3D location of the eye tracking calibration point, the second area larger than the first area and concentric with the first area;
      in response to determining that the user is looking at the eye tracking calibration point and calibration is unnecessary based on the detected gaze point being within the first area, maintain an existing calibration of the HMD;
      in response to determining that the user is looking at the eye tracking calibration point and calibration is necessary based on the detected gaze point being outside of the first area but within the second area, calibrate the HMD to correct a difference between the eye tracking calibration point and the detected gaze point; and
      in response to determining that the user is not looking at the eye tracking calibration point based on the detected gaze point being outside of the second area, maintain the existing calibration of the HMD.

9. The HMD of claim 8, wherein the at least one processor is configured to:
   render the at least one object, wherein the at least one object is an interface element with which the user interacts; and
   detect the gaze point of the user at a time when the user interacts with the at least one object.

10. The HMD of claim 8, wherein:
    the at least one object is an object in the XR environment; and
    to determine the at least one object as the eye tracking calibration point, the at least one processor is configured to determine that the user is likely to look at the at least one object during natural use of the HMD.

11. The HMD of claim 10, wherein, to determine the 3D location of the eye tracking calibration point, the at least one processor is configured to create the 3D reconstruction map of the XR environment using simultaneous localization and mapping (SLAM).

12. The HMD of claim 8, wherein the at least one object includes a plurality of objects arranged at different depths within the XR environment.

13. The HMD of claim 8, wherein the at least one processor is further configured to:

before determining the at least one object as the eye tracking calibration tracking point, perform an initial calibration that comprises:
- generating at least one target location in the XR environment;
- instructing the user to look at the at least one target location;
- detecting one or more gaze points of the user after instructing the user to look at the at least one target location; and
- calibrating the HMD based on the one or more detected gaze points of the user compared to the at least one target location.

14. The HMD of claim 8, wherein the XR environment is one of: a virtual reality environment, an augmented reality environment, and a mixed reality environment.

15. A non-transitory computer readable medium embodying a computer program, the computer program comprising computer readable program code that, when executed, causes at least one processor to:
- determine at least one object within a three-dimensional (3D) extended reality (XR) environment as an eye tracking calibration point;
- create a 3D reconstruction map of the XR environment;
- determine a 3D location of the eye tracking calibration point within the XR environment based on a location of the eye tracking calibration point in the 3D reconstruction map;
- detect a gaze point of a user of a head-mountable device (HMD);
- compare the detected gaze point to a first area of the XR environment that includes the 3D location of the eye tracking calibration point and to a second area of the XR environment that includes the 3D location of the eye tracking calibration point, the second area larger than the first area and concentric with the first area;
- in response to determining that the user is looking at the eye tracking calibration point and calibration is unnecessary based on the detected gaze point being within the first area, maintain an existing calibration of the HMD;
- in response to determining that the user is looking at the eye tracking calibration point and calibration is necessary based on the detected gaze point being outside of the first area but within the second area, calibrate the HMD to correct a difference between the eye tracking calibration point and the detected gaze point; and
- in response to determining that the user is not looking at the eye tracking calibration point based on the detected gaze point being outside of the second area, maintain the existing calibration of the HMD.

16. The non-transitory computer readable medium of claim 15, wherein the computer readable program code when executed causes the at least one processor to:
- render the at least one object, wherein the at least one object is an interface element with which the user interacts; and
- detect the gaze point of the user at a time when the user interacts with the at least one object.

17. The non-transitory computer readable medium of claim 15, wherein:
- the at least one object is an object in the XR environment; and
- the computer readable program code when executed causes the at least one processor to determine the at least one object as the eye tracking calibration point by determining that the user is likely to look at the at least one object during natural use of the HMD.

18. The non-transitory computer readable medium of claim 17, wherein the computer readable program code when executed causes the at least one processor to determine the 3D location of the eye tracking calibration point by creating the 3D reconstruction map of the XR environment using simultaneous localization and mapping (SLAM).

19. The non-transitory computer readable medium of claim 15, wherein the at least one object includes a plurality of objects arranged at different depths within the XR environment.

20. The non-transitory computer readable medium of claim 15, wherein the computer readable program code when executed further causes the at least one processor to:
before determining the at least one object as the eye tracking calibration point, perform an initial calibration that comprises:
- generating at least one target location in the XR environment;
- instructing the user to look at the at least one target location;
- detecting one or more gaze points of the user after instructing the user to look at the at least one target location; and
- calibrating the HMD based on the one or more detected gaze points of the user compared to the at least one target location.

* * * * *